United States Patent [19]
Ando

[11] 3,834,359
[45] Sept. 10, 1974

[54] NOXIOUS GAS MINIMIZING METHOD AND APPARATUS FOR AN INTERNAL-COMBUSTION ENGINE

[75] Inventor: Akira Ando, Yokohama, Japan

[73] Assignee: Safer Co., Ltd., Tokyo, Japan

[22] Filed: Apr. 3, 1972

[21] Appl. No.: 240,721

[30] Foreign Application Priority Data
Apr. 30, 1971 Japan............................ 46-29283

[52] U.S. Cl.......... 123/1 A, 123/119 R, 123/198 A, 60/276
[51] Int. Cl...................... F02b 47/00, F02m 25/00
[58] Field of Search............ 123/1 A, 198 A, 119 R, 123/119 E, 97 B; 60/276

[56] References Cited
UNITED STATES PATENTS
| | | | |
|---|---|---|---|
| 2,052,763 | 9/1936 | Gravell | 123/198 A |
| 2,140,254 | 12/1938 | Zavka | 123/1 A |
| 2,355,090 | 8/1944 | Love et al. | 60/276 X |
| 2,369,698 | 2/1945 | Willemborg | 123/119 E |
| 3,158,144 | 11/1964 | Walker | 123/97 B |

FOREIGN PATENTS OR APPLICATIONS
| | | | |
|---|---|---|---|
| 343,361 | 9/1936 | Italy | 123/119 E |

*Primary Examiner*—Wendell E. Burns
*Attorney, Agent, or Firm*—Wenderoth, Lind & Ponack

[57] ABSTRACT

A method and apparatus for minimizing noxious gases that are contained in the waste gas of an internal-combustion engine wherein a liquid for minimizing the said gases (hereafter referred to as "the liquid") is automatically injected into the combustion chamber in a quantity equivalent to the volume of the produced noxious gases, and a method for protecting the internal-combustion engine.

16 Claims, 14 Drawing Figures

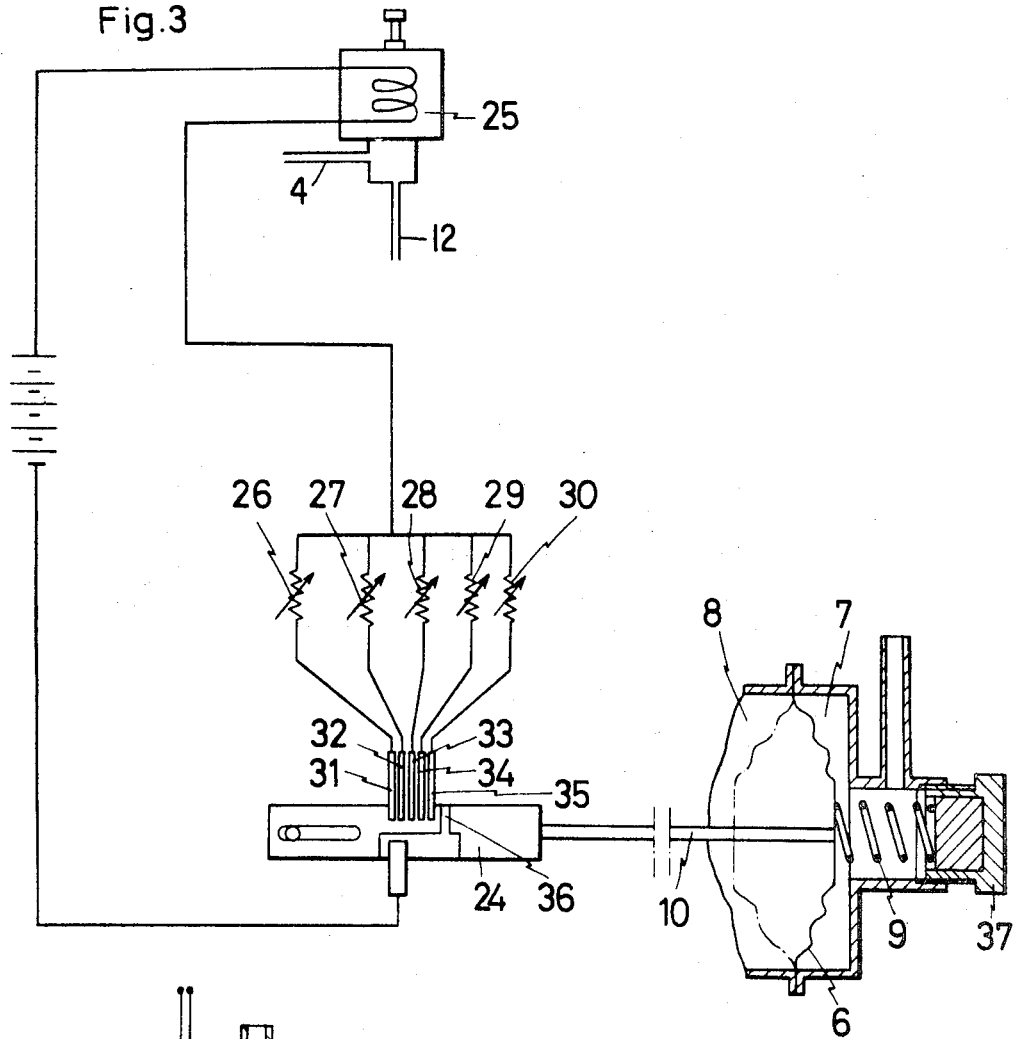
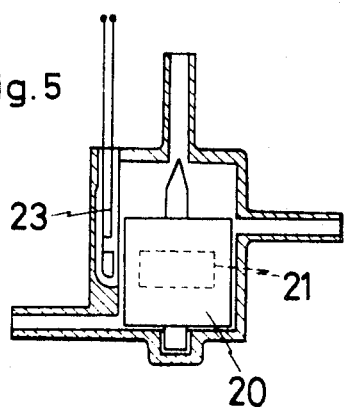
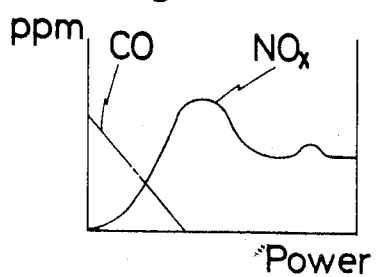

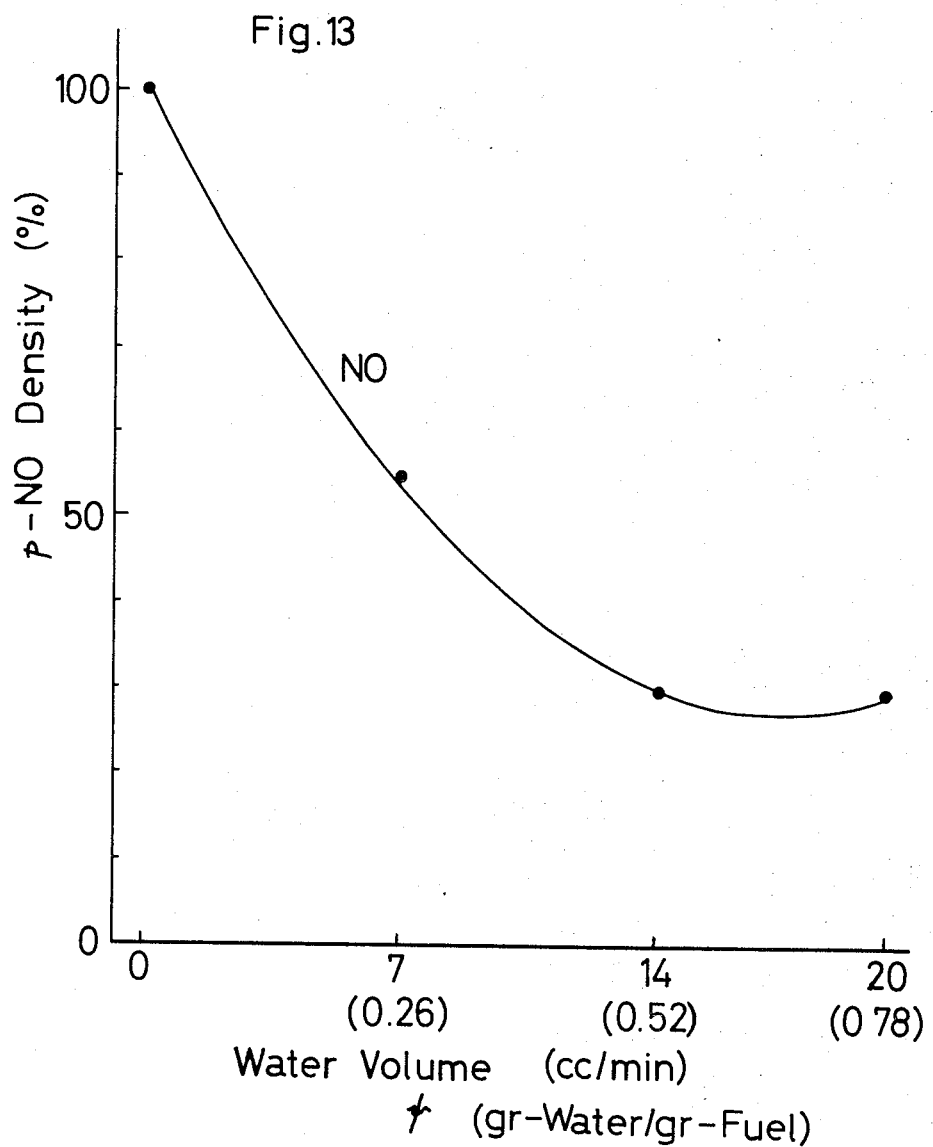

NOXIOUS GAS MINIMIZING METHOD AND APPARATUS FOR AN INTERNAL-COMBUSTION ENGINE

BACKGROUND OF THE INVENTION

It is generally understood that carbon monoxide and nitrogen oxide which are contained in the waste gas of an internal-combustion engine are noxious and also become a cause of photochemical smogs, and a number of concepts that have been proposed to prevent and eliminate such noxious gases have not brought about any satisfactory solution from the technical standpoint. Carbon monoxide and nitrogen oxide which are contained in the engine waste gas are considered to be produced in the center of the combustion chamber and to be discharged in a state of balance or in a neutral state in the neighborhood of the chemical equilibrium density at the time of the maximum combustion temperature, and consequently an effective means of decreasing the volume of the produced noxious gases is to lower the said combustion temperature.

For example, one method consists in recirculating relatively inert gas, such as the exhaust gas equivalent to 10 to 20 percent of the air introduced, inside the combustion chamber. However, this is not recommended in that it not only causes the volumetric efficiency to fall, followed by a considerable drop of the engine output, but also increases the density of carbon monoxide and hydrocarbon.

Another method is to inject water and the like into the combustion chamber. In his study of means of preventing and eliminating the noxious gases that are contained in the waste gas of an internal-combustion engine, the present inventor has discovered that a considerable reduction in the amount of the carbon monoxide and nitrogen oxide produced can be achieved by introducing into the combustion chamber the liquid in a quantity proportional to the value of the negative pressure in the suction pipe of the internal-combustion engine, and has obtained good results therefrom. The experiments have shown that the production of the noxious gases is not proportional to the output of the engine but varies irregularly with the output. With the above fact in view, the inventor has successfully accomplished a reasonable and effective means of preventing and eliminating the noxious gases by regulating the volume of the injected liquid in proportion to the density of the produced noxious gases.

In other words, it has been recognized that carbon monoxide is produced in a greater quantity at a lower output of the engine and gradually decreases as the output increases, while nitrogen oxdie (NOx) begins gradually to increase at one-fifth of the maximum engine output, arriving at the maximum quantity at one-third, and then increases a little more just before the engine reaches the maximum output and gradually declines thereafter, remaining at a constant quantity until the engine output reaches the maximum. In consideration of the above fact, the inventor has been able to prevent and eliminate the produced noxious gases more readily by regulating the volume of the injected liquid in proportion to that of the produced noxious gases. The liquid which is injected into the combustion chamber for the above purpose, gradually evaporating during the engine operation and lowering or reducing the temperature inside the chamber, can attain the desired object, but it has a disadvantage in that it erodes the combustion chamber and causes deterioration of the oil as there is a possibility that the liquid will remain in the chamber after the internal combustion ends. This disadvantage may be eliminated by stopping the liquid injection at a proper time before the engine is stopped, and the earlier stopping of the liquid injection overcomes the problem of the liquid remaining in the chamber, which nevertheless reduces the efficiency in preventing and eliminating the noxious gases.

The result obtained from the above is that the liquid injection should be stopped within such a time limit as to prevent the liquid from remaining in the chamber without lowering the aforesaid efficiency. The aforesaid time limit depends on the capacity and the type of the combustion chamber, and the tests show that the optimum limit is about five seconds for small-size engines like autocycles, about one minute for large-size engines and about ten seconds for general automobile engines.

BRIEF SUMMARY OF THE INVENTOR

This invention is intended for regulating the volume of the injected liquid in proportion to the output of the internal-combustion engine, based on a certain correlation that exists between the engine output and the volume of the noxious gases produced, and also a certain correlation that exists between the volume of the produced noxious gases and the volume of the injected liquid.

It is necessary, therefore, that the injection of the liquid be controlled according to the predetermined curve, because the engine output is not proportional to the volume of the produced noxious gases. As the engine output varies in proportion to the value of the negative pressure in the suction pipe, the controlled injection can be attained by regulating a needle valve to admit the injected liquid in a quantity corresponding to the value of the negative presure and by changing the amount according to the curve of the produced gases in relation to the engine output.

There are different types of equipment which can be used to stop the liquid injection earlier than the engine, among which is a delay line circuit pre-set to a determined time, for example, which can keep the engine functioning for a certain time even after the engine is switched off. One object of the invention is to regulate the volume of the liquid that is injected into the combustion chamber as the engine output varies, thereby minimizing the quantity of the noxious gases that are contained in the waste gas of the internal-combustion engine.

Another object is to introduce the liquid into the combustion chamber in a quantity corresponding to a pre-determined curve of the produced noxious gases produced in relation to the engine output.

A still another object is to regulate the injection of the liquid by means of a needle valve equipped with a cam designed from the aforesaid curve. A further object is to regulate the voltage of an electro-magnetic needle valve which is mounted on the discharge pipe, depending on the variation in the volume of the gases produced relative to the engine output.

A still further object is to stop the liquid injection autmatically at a certain time before the engine is stopped.

BRIEF DESCRIPTION OF THE DRAWINGS

FIG. 3 shows one example of the voltage regulation means for an electro-magnetic needle valve.

FIG. 5 is a sectional view of a liquid regulating valve for use in the embodiment of FIG. 1.

FIG. 6 is a diagram showing a correlation between the engine output and the volume of the noxious gases produced.

FIG. 13 is a diagram showing the variations of the volume of nitrogen oxide in the waste gas in relation to the volume of the injected liquid.

DETAILED DESCRIPTION OF THE INVENTION

This invention relates to a method for minimizing the noxious gases that are produced in an internal-combustion engine, wherein liquid (ammonia water, for example) is automatically injected into the combustion chamber in an amount corresponding to the produced noxious gases; the invention also relates to apparatus used in the liquid injection system for the prevention of the noxious gases; to a method for protecting the engine by removing the excess liquid therefrom. It has been confirmed that carbon monoxide, nitrogen oxide or other noxious gases are present in the gas which an internal-combustion engine exhausts at the time of its start, varying in quantity proportionally with the engine output. In order to minimize these noxious gases, the inventor has successfully achieved a means of reducing such gases to a remarkable degree by injecting a proper amount of the liquid into the combustion chamber, and more specifically by regulating the volume of the liquid as the engine out put varies, the volume of the injected liquid and that of the produced gases being correlated.

Figure 1:
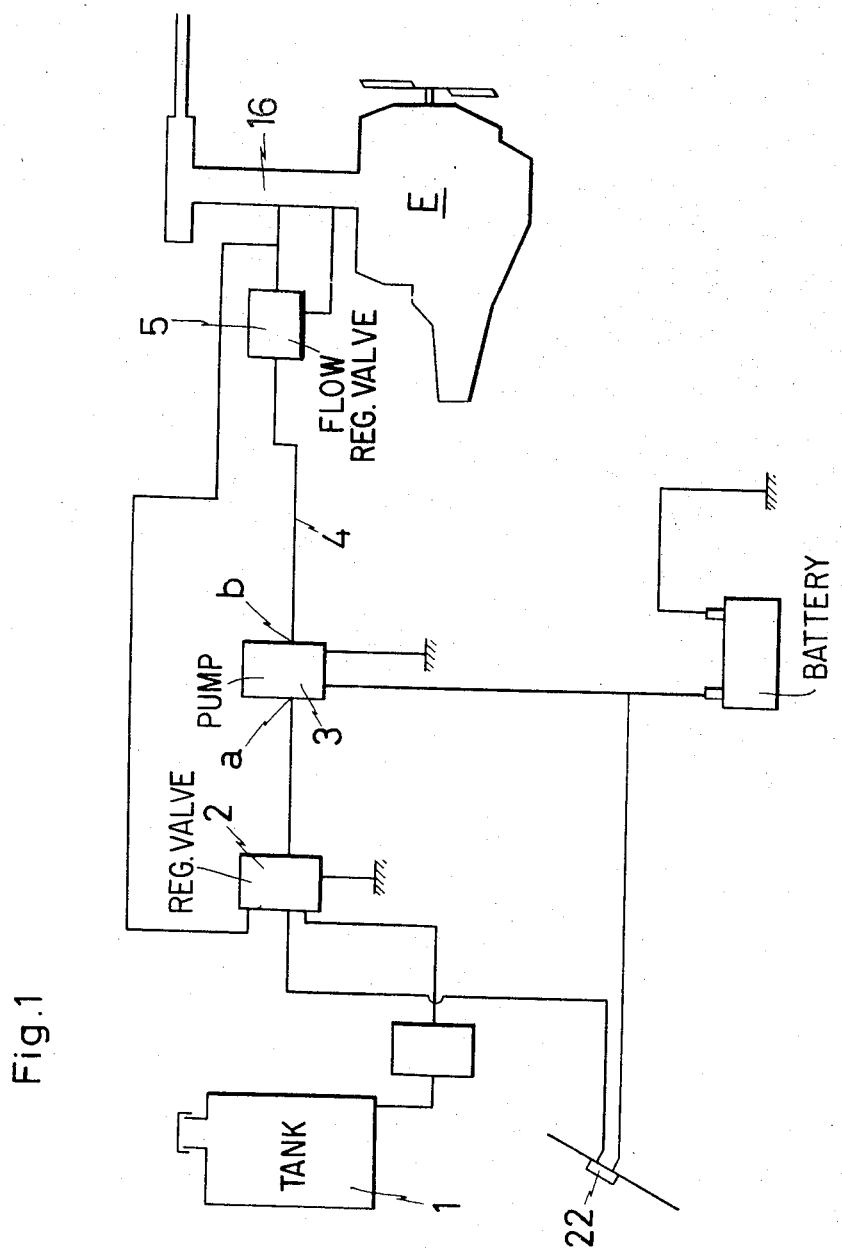
FIG. 1 is a block diagram of one embodiment of the invention.

In the apparatus of FIG. 1, the liquid is distributed from a tank 1 to the suction side $a$ of an electric motor pump 3 by way of a liquid regulating valve 2 and is discharged at constant pressure from the discharge side $b$ of the same pump 3. The liquid thus discharged at constant pressure flows to a flow regulating valve 5 by way of a distributing pipe 4. The interior of the flow regulating valve 5 (shown in FIG. 2) is separated by an elastic diaphragm 6 into a chamber 7 leading to the suction pipe 16 forming part of the air intake of the engine E and a chamber 8 open to the outside. The chamber 7 has a spring 9 therein pressing the elastic diaphragm 6 toward the chamber 8. One end of a rod 10 is slidably mounted in said chamber 8 and the other end is fixed to the elastic diaphragm 6. The upper edge of the rod 10 is shaped to form a cam 11. A spring 15 is engaged with a needle valve 13 in a liquid distributing pipe 12 into which pipe 4 opens past the needle valve, and a roller 14 on the needle valve 13 engages cam 11 so that the opening of the needle valve 13 can be regulated according to the highs and lows of the cam 11 by sliding the rod 10.

The cam 11, having highs and lows similar to curves of the diagram of the volume of the gases produced in relation to the engine output, can slide depending on the engine output variations. In other words, the elastic diaphragm 6 moves in proportion to the negative pressure of the suction pipe 16, and moves the cam 11 to regulate the needle valve 13 as the engine output varies.

Figure 2:
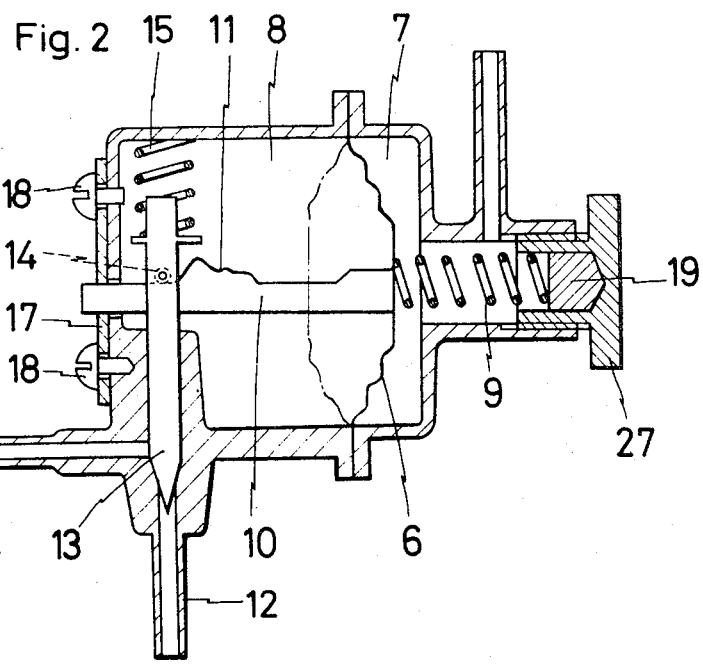
FIG. 2 is a sectional view of valve control means forming part of the embodiment of FIG. 1 and; which regulates the opening of a needle valve using a cam designed from the curve of the volume of the noxious gases produced in relation to the engine output.

In FIG. 2, 17 is a plate supporting one end of the rod 10, said plate being adjustably fixed on the side wall of the flow regulating valve 5 so that the maximum open position of the needle valve 13 can be regulated by adjusting the position of the plate when the screws 18 are loose.

19 is a thermal expandable piece that expands or contracts due to the changes in temperature of itself or its surroundings in order to adjust the tensions of the spring 9 according to the temperature.

The liquid regulating valve 2, shown in detail in FIG. 5, has a float 20 inside, said float 20 having a permanent magnet 21 therein which closes a switch 23 of a pilot lamp 22 when the float 20 comes down to the bottom in order to indicate that the liquid is gone.

FIG. 3 shows another embodiment of the invention wherein a slider 24 is connected to the rod 10 similar to the rod 10 in FIG. 2, in place of cam 11. A circuit for an electro-magnetic valve 25 for the liquid supply pipe 12 comprises a number of resistances 26, 27, 28, 29, 30 connected in parallel, and the slider 24 is equipped with a movable switch 36 that is slidably connected with fixed switches 31, 32, 33, 34, 35 for the aforesaid resistances.

Figure 4:
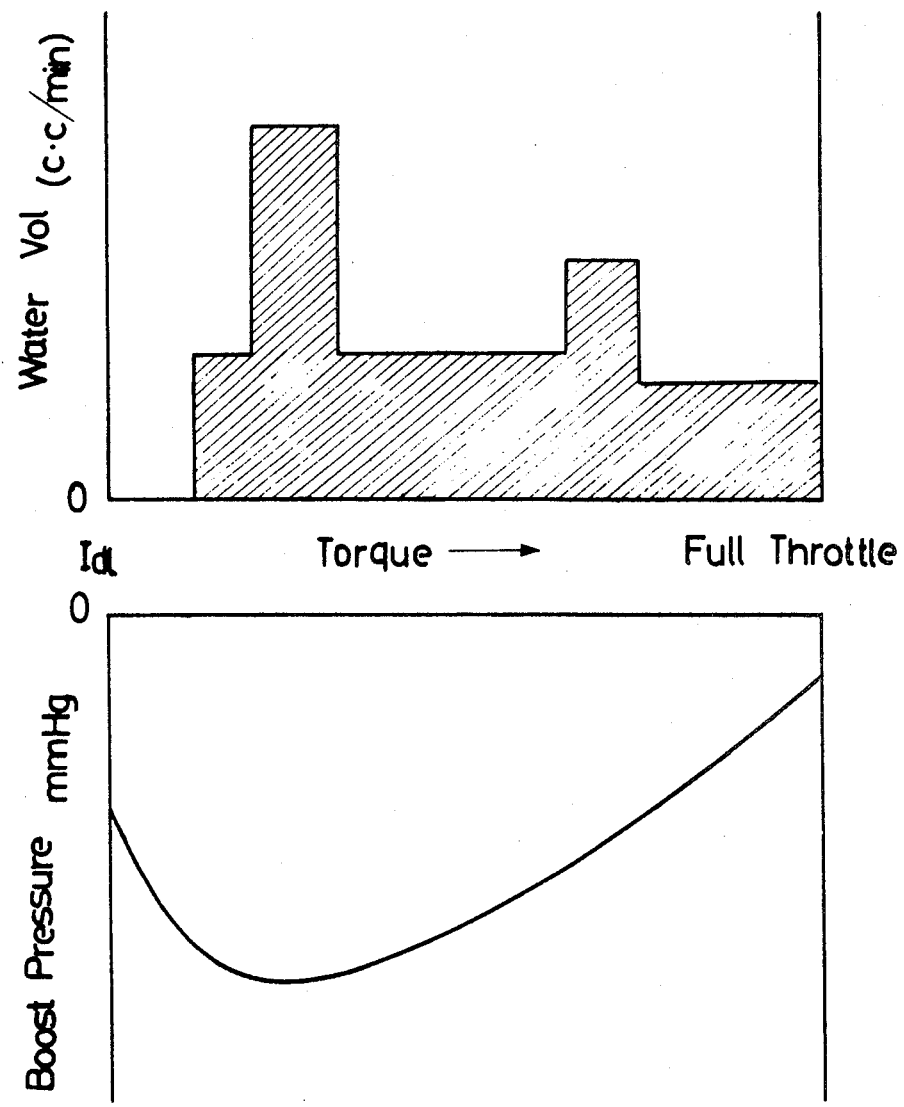
FIG. 4 is a diagram showing the volume of the liquid injected by the device of FIG. 3.

This embodiment makes it possible to regulate the volume of the injected liquid by means of the electro-magnetic valve 25 the amount of opening of which is regulated by the different circuit resistances contacted during the sliding of the rod. In this case, the amount the electro-magnetic valve opens gradually varies, and gradually changes the volume of the liquid accordingly, as shown in FIG. 4.

With an increased number of the parallel resistances, a satisfactory liquid supply regulation can be obtained for practical use. In FIG. 3, 37 is a regulating screw which, upon adjustment, regulates the pressure given to the elastic diaphragm of the spring 9, and thereby adjusts the time of the initial liquid injection. With the resistances 26, 27, 28, 29, 30 being variable, it is possible freely to adjust the liquid volume in proportion to the engine output.

Figure 7:
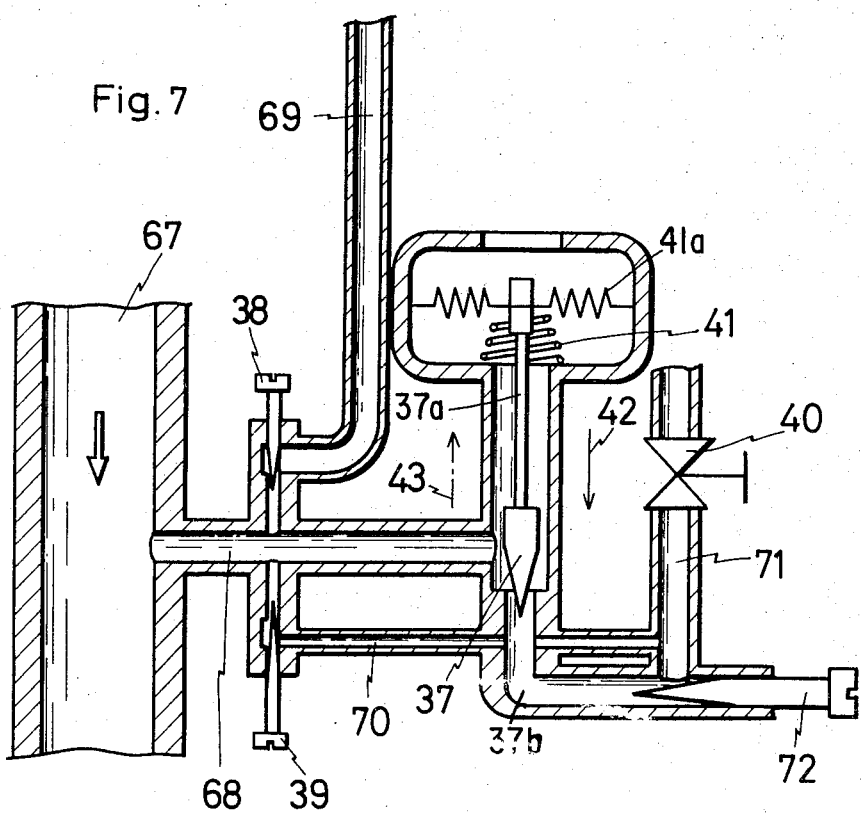
FIG. 7 is a sectional view of a further embodiment of means for regulating the volume of the injected liquid in relation to the engine output.

The following describes one example of a liquid injecting apparatus for an internal-combustion engine as shown in FIG. 7, which makes it possible to regulate the volume of the liquid as the negative pressure of the suction pipe varies.

One end of an injecting pipe 68 is connected to a conduit 67 linking a carburetor with a combustion chamber, an air intake pipe 69 and a small liquid supply pipe 70 are connected to the injecting pipe 68 from points on opposite sides of the pipe, and the pipe 70 is connected to a liquid supply pipe 71 through conduit 37b and pipe 70 in turn is connected to the other end of the injecting pipe 68 by way of a manually-operated valve 72 and a needle valve 37 for regulating the injected liquid. In FIG. 7, 38 is an air regulating valve, 39 is a manually-operated valve in the small liquid supply pipe, and 40 is a switch valve in the supply pipe 71, said switch valve 40 being so built as to allow an automatic or manual operation of the stop or start of the liquid supply.

In the apparatus described above, with the manually-operated valves 72 and 39 adjusted to the capacity and the type of the engine being used and with the switch valve 40 being opened at the same time as the engine starts, the liquid being pumped out of a tank at constant pressure is distributed to the combustion chamber, passing through the switch valve 40 to the supply pipe 71 and the small pipe 70 from which it then flows through the injecting pipe 68 and the conduit 67 when the engine is idling. The opening of the needle valve 37 is automatically regulated as the suction pressure varies in proportion to the speed of the fuel flowing through the conduit 67.

When the engine is running so as to produce a lesser output, a greater suction is present in conduit 67 and the needle valve 37 moves in the direction indicated by the solid line arrow 42 in FIG. 7 as air pressure on the diaphragm 41a to which the shaft 37a of needle valve 37 acts against the elastic spring 41. This tends to close needle valve 41 so that less liquid is admitted to pipe 68. When there is less suction during increased engine output, the needle valve 37 moves in the direction indicated by the dot-dash-line arrow 43 in FIG. 7, due to the action of the elastic spring 41, and more liquid is admitted to pipe 68.

Most automobile engines will have a negative pressure in the suction pipe as shown in FIG. 4, and therefore a lesser amount of the liquid supplied to the valve 40 at constant pressure is supplied at a high engine speed where a less amount of the noxious gases occur, and the amount of liquid increases at a medium speed where a greater amount of the said gases are produced thus increasing the capability of minimizing the noxious gases.

However, the engine output falls drastically when too much liquid is injected, and accordingly the manually-operated valve 72 is provided regulate the maximum quantity of the liquid to be injected. The valve 39 is provided to regulate the minimum flow of the injected liquid in order to reduce carbon monoxide while the engine is idling.

Because the liquid that may remain in the combustion chamber after the engine is stopped badly influences the chamber, it is desirable that the injection be stopped at a certain time before the engine comes to a stop.

The present invention protects the combustion chamber by keeping the engine operating for a certain time after the injection has come to a halt.

Several embodiments of apparatus for accomplishing this can be provided.

Figure 8:
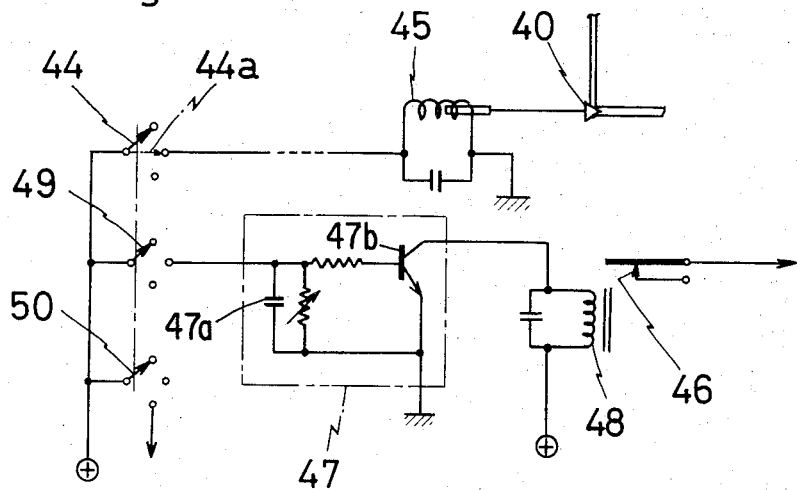
FIG. 8 is a circuit diagram of an embodiment wherein a liquid distributing circuit is electrically closed before the engine is stopped.

Reference is made to FIG. 8 where a key switch 44, such as a conventional three-position ignition switch for an automobile engine, is moved from a position 44a indicated by a dot-dsh-line to the full line position to initiate stopping of the engine. This deenergizes a relay 45 which was holding the switch valve 40, such as in the device of FIG. 7, open, which cuts off the supply of liquid. A switch 46 on the primary side of an ignition coil is placed in the on position when a relay 48 is energized. The relay 48 is connected to the output side of a delay-line unit 47, to which electric power is supplied through key switch 49 gauged with switch 44. After switch 49 is opened, power is supplied to the relay 48 for a short time by the current from capacitor 47a continuing to bias the base of transistor 47b so that the switch 46 is kept closed and the engine keeps running.

Figure 9:
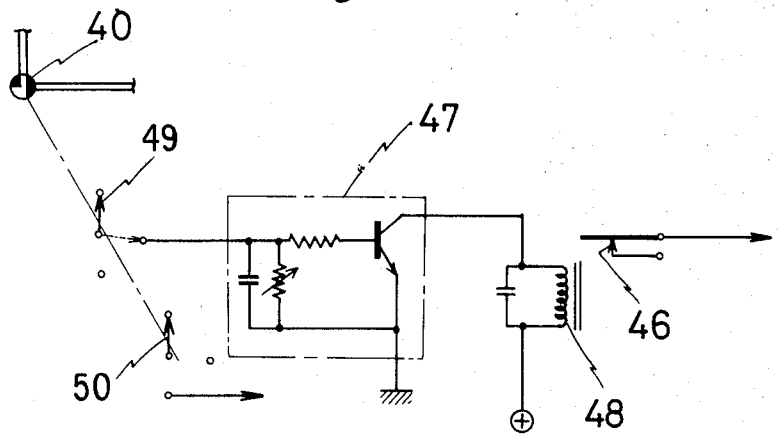
FIG. 9 is a circuit diagram of an embodiment wherein the liquid distributing circuit is manually closed.

The relay 48 is deenergized when the input from the delay-line circuit stops, and the switch opens to stop the engine. A self-start switch 50 for the engine is also gauged with switches 44 and 49. According to the embodiment as shown in FIG. 9, the ignition key switches are mechanically connected to the switch valve 40, which is opened when switches 49 and 50 are closed, and vice versa. The delay circuit is the same as in the embodiment of FIG. 8.

Figure 10:
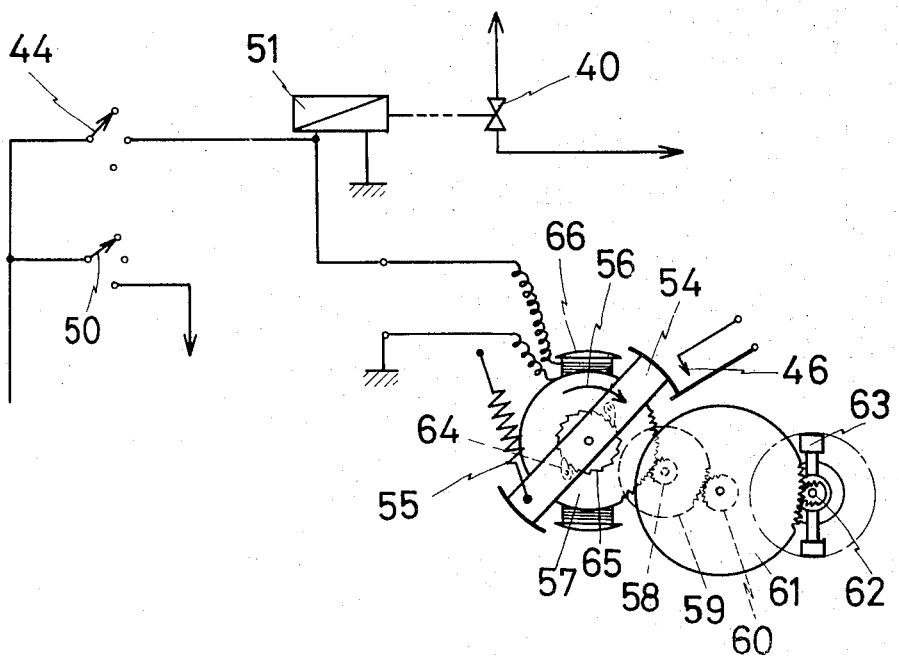
FIG. 10 is a circuit diagram of an embodiment wherein the liquid distributing circuit is electrically closed by a mechanical delay line unit.

The mechanical delay unit comprises a rotatable lever 54 which in a first rotational position is generally vertical in FIG. 10 is out of engagement with ignition coil switch 46 and in a second rotational position as shown in FIG. 10 engages switch 46 to open it. The lever 54 has pawls 64 thereon which engage a ratchet wheel 65 mounted on a gear 57 which is at one end of a gear train 57–61, with the gear 61 engaging a bear 62 on a governor 63. The end of the lever 54 opposite the end engaging the switch 46 has a spring 55 connected thereto which urges the lever into contact with the switch 46. A coil 66 is provided which when ENERGIZED, SWINGS THE lever 54 to the first position. The coil is connected in parallel with the relay 51 and is energized and deenergized at the same time as the relay 51.

In operation, when the Switch 44 is closed after the engine is started, the coil 66 is energized to swing the arm 54 to the first position, thereby closing switch 46. The arm 54 can move counterclockwise since the pawls 64 will move along the ratchet wheel 65. When the switch 44 is opened, the coil 66 is deenergized, and the spring 55 urges the arm 54 in the clockwise direction. The pawls 64 engage the ratchet wheel 65, and the gear train 57–61 and governor 62,63 slow the speed of rotation of the arm 54, thereby causing a delay between the moment of deenergization of coil 66 and the engagement of the arm 54 with the switch 46 to open the switch.

Figure 11:
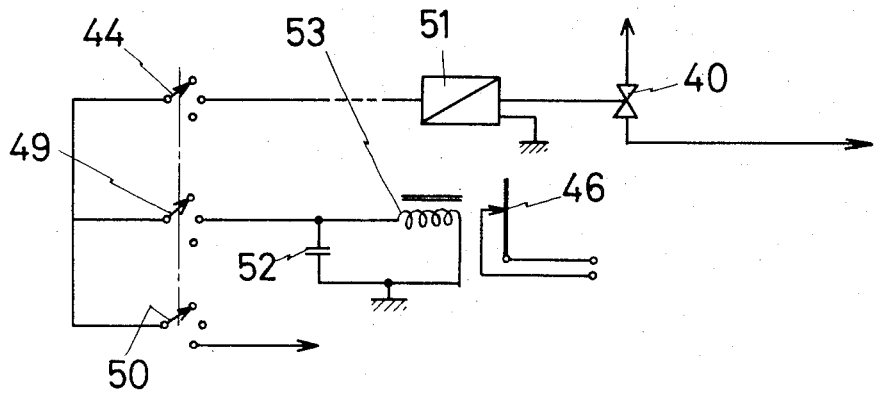
FIG. 11 is a circuit diagram of another embodiment wherein the liquid distributing circuit is electrically closed.

FIG. 11 is another embodiment wherein the switch valve 40 is operated by means of an electro-magnetic unit 51 and the opening of the switch 46 is delayed by means of a high sensitivity relay 53 and a condenser 52 used as a delay line unit.

Figure 12:
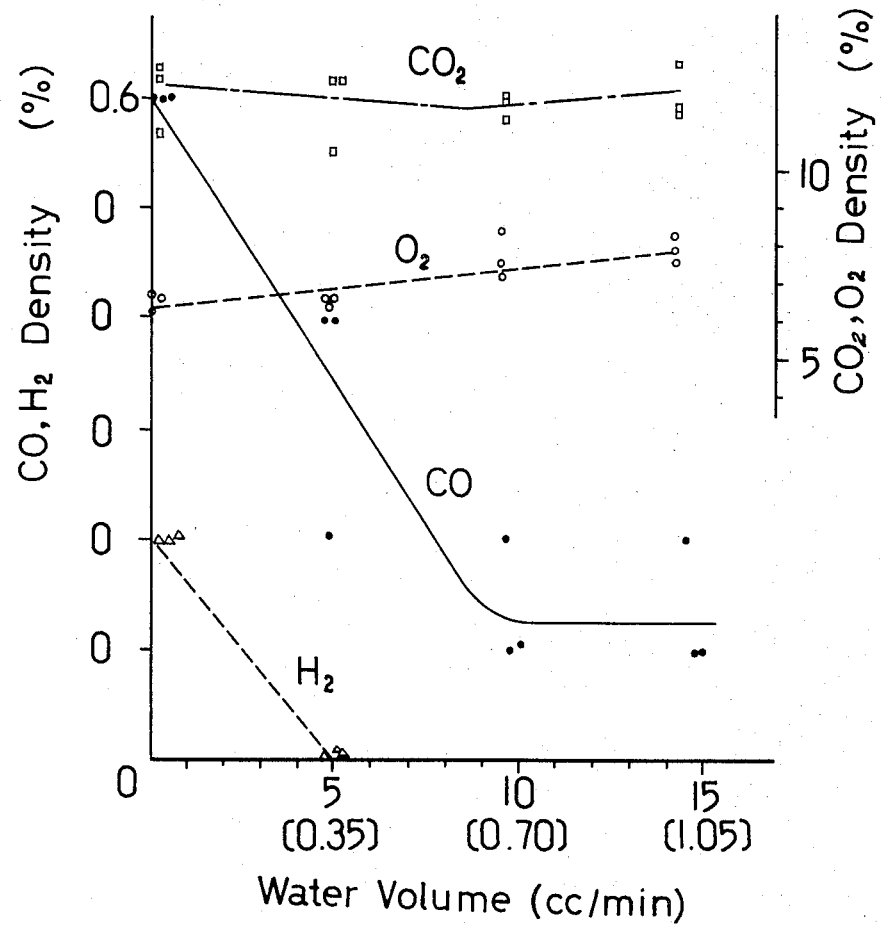
FIG. 12 is a diagram showing the relation between the volume of the injected liquid and the volume of carbon monoxide contained in the engine waste gas.

FIGS. 12 and 13 show the variations of carbon monoxide and nitrogen oxide volumes discharged when the liquid is injected into the combustion chamber, which have been measured when the engine is rotating with a torque of 5.4 kg-m and at a speed of 2,500 r.p.m. In other words, the volumes of carbon monoxide and nitrogen oxide contained in the waste gas become less with an increased quantity of the liquid, but the efficiency of the injected liquid drastically declines when the ratio of the liquid to the fuel exceeds 0.5, the carbon monoxide quantity is constant when the said ratio is above 0.7, and nitrogen oxide is inclined to increase a little when the ratio is 0.6 at the minimum.

Figure 14:
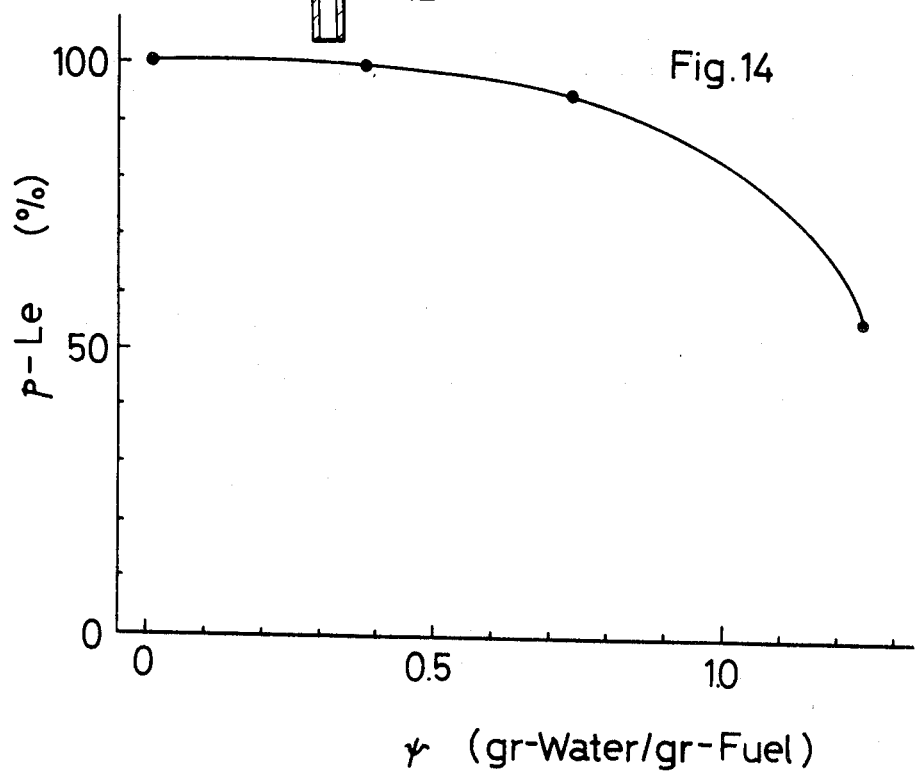
FIG. 14 is a diagram showing the variations of the engine output in relation to the liquid injection.

The engine output remains unchanged until the said ratio reaches 0.5 as shown in FIG. 14, and is inclined to decline drastically thereafter.

It follows from the foregoing that the ratio of the injected liquid to the fuel should be limited to 0.5 by weight, and the proper quantity of the liquid should be injected as occasions arise.

FIGS. 8 to 11 show embodiments for use with gasoline engines; as for diesel engines, the fuel system or compressor system is operated by a delay-line unit in order to stop the liquid injection. More specifically, the present invention provides the advantage of reducing the volume of the produced noxious gases in an effective and reasonable manner by regulating the volume of the injected liquid corresponding to that of the noxious gases contained in the waste gas of the internal-combustion engine.

Furthermore, the invention makes it possible to reduce the volume of the noxious gases without any change in the engine output by controlling the ratio of the liquid to the fuel at 0.5 In addition, the invention can reduce the volume of the nitrogen oxide produced by mixing a proper quantity of ammonia water with water (30 percent ammonia solution) equivalent to $4NH_3 + 6NO = 5N_2 + 6H_2O$, for example.

The invention, which is intended to stop the engine in a certain time after the liquid injection is stopped, can avoid any corrosion of the combustion chamber, deterioration of lubricating oil or other defects that may arise due to the liquid remaining in the said chamber. It is to be understood that the invention is not limited to the precise embodiments described above and that minor modifications may be made within the scope of the invention.

What is claimed is:

1. A method for minimizing the amount nitrogen oxide and carbon monoxide gases contained in the waste gas produced by the burning of fuel in an internal combustion engine comprising injecting into the intake of the engine an amount of ammonia water effective for minimizing the amount of such nitrogen oxide and carbon monoxide gases produced by the engine, the amount of said ammonia water introduced for a given output of the engine being in substantially direct proportion to the quantity of nitrogen oxide and carbon monoxide gases which would be produced at that output of the engine in the absence of the injection of the ammonia water.

2. A method as claimed in claim 1 in which the amount of said liquid is varied as the output of the engine is varied in proportion to the change in amounts of nitrogen oxide and carbon monoxide gases which would be produced at the corresponding outputs of the engine in the absence of the injection of the ammonia water.

3. A method as claimed in claim 1 in which the internal combustion engine has a suction pipe between an air intake, and the combution chamber, and the step of injecting the ammonia water comprises feeding the ammonia water into the suction pipe in the proportions for the various outputs of the engine in response to the values of the negative pressure in the suction pipe at the various outputs of the engine.

4. An apparatus for minimizing the nitrogen oxide and carbon monoxide gases contained in the waste gas produced by the burning of fuel in an internal combustion engine having an air intake and a suction pipe between the air intake and the combustion space of said engine, said apparatus comprising a supply of liquid effective for minimizing the amount of such gases produced by the engine, a supply pipe extending between the supply and the suction pipe, a valve means in said supply pipe, and control means coupled to said valve means and responsive to conditions in said suction pipe at various outputs of the engine for controlling the position of said valve means for opening it to supply liquid in substantially direct proportion to the quantity of nitrogen oxide and carbon monoxide gases which would be produced at said various outputs of the engine in the absence of the injection of the liquid.

5. An apparatus as claimed in claim 4 in which said control means comprises a cam engaged with said valve means and having a profile with peaks and the valleys in substantially direct proportion to the amounts of noxious gases which would be produced at various outputs of the engine in the absence of the injection of the liquid, a suction chamber coupled to said suction pipe and having a diaphragm therein movable in response to the negative pressure in said suction pipe at various outputs of the engine, said cam being coupled to said diaphragm, whereby when the negative pressure in said suction pipe changes in response to changed output of the engine, the cam is moved by the diaphragm to move the needle valve to adjust the amount of liquid injected into the suction pipe in accordance with the cam profile.

6. A method as claimed in claim 1 in which the ratio of the volume of the injected ammonia water to that of fuel is a maximum of 0.5

7. A method as claimed in claim 1 further comprising stopping the engine a certain time after the ammonia water injection is stopped, whereby the liquid in the engine is removed during the time it runs without ammonia water injection taking place, and the engine is thereby protected from the effects of the ammonia water when the engine is not running.

8. An apparatus as claimed in claim 4 in which said control means comprises a slidable switch contact, a suction chamber coupled to said suction pipe and having a diaphragm therein movable in response to the negative pressure in said suction pipe, said slidable switch contact being coupled to said diaphragm, an electromagnet connected to said valve means for moving the valve means in proportion to the current therethrough, and a plurality of parallel circuits each having a resistance therein directly proportional to the quantity of noxious gases produced at one output of the engine, each circuit having a contact engageable by the slidable switch contact during movement of the slidable switch contact, said parallel circuits and slidable switch contact being coupled with said electromagnet, whereby when the slidable switch contact moves as the negative pressure in the suction pipe changes, the electromagnet moves the needle valve in accordance with the resistances in the various parallel circuits.

9. An apparatus as claimed in claim 8 in which said resistances are variable resistances.

10. An apparatus as claimed in claim 4 in which said control means comprises a suction chamber coupled to said suction pipe and having a diaphragm therein movable in response to the negative pressure in said suction pipe, and said valve means is a needle valve connected to said diaphragm and movable thereby in response to changing pressure in said suction pipe, and a small supply pipe from said supply of liquid and having a control valve therein and opening into said supply pipe between the needle valve and the suction pipe for supplying a minimum amount of liquid when the needle valve is closed.

11. An apparatus as claimed in claim 10 further comprising a manually adjustable control valve in said supply pipe between the needle valve and the supply of liquid for setting the maximum amount of liquid which can be supplied.

12. An apparatus as claimed in claim 4 further comprising means for causing the engine to run for a time after the supply of liquid is shut off, said means comprising a shut off valve in said supply pipe between said supply of liquid and said valve means, a primary ignition switch for said engine, delay means coupled to said primary ignition switch for opening of said primary ignition switch after a delay, and switch means coupled to said shut off valve and said delay means for closing said shut off valve and actuating said delay means, whereby said liquid is shut off and thereafter the engine runs for a period of time so that no liquid remains in the combustion space after the engine has stopped.

13. An apparatus as claimed in claim 12 in which said shut off valve is an electromagnetically actuated valve and said switch means deenergizes said electromagnetically actuated valve for closing it.

14. An apparatus as claimed in claim 4 in which said shut off valve is a mechanical valve and said switch means is mechanically connected to said shut off valve for opening and closing it.

15. An apparatus as claimed in claim 12 in which said delay means is an electrical delay means comprising a delay circuit and a relay for actuating said primary ignition switch, said delay means keeping said relay energized for a time after said switch means actuates said delay means.

16. An apparatus as claimed in claim 12 in which said delay means is a mechanical delay means comprising a magnetically swingable arm swingable between a first position disengaged from said primary ignition switch and a second position engaged with said primary ignition switch to open it, electromagnet means for swinging said arm to said first position when engaged, spring means coupled to said arm urging it toward the second position, and governor means coupled to said arm for slowing the movement of the arm when the electromagnet means is deenergized.

* * * * *